June 1, 1965     T. E. FOSSARD     3,186,731
VEHICLE SUSPENSIONS
Filed Dec. 7, 1964                                        5 Sheets-Sheet 1
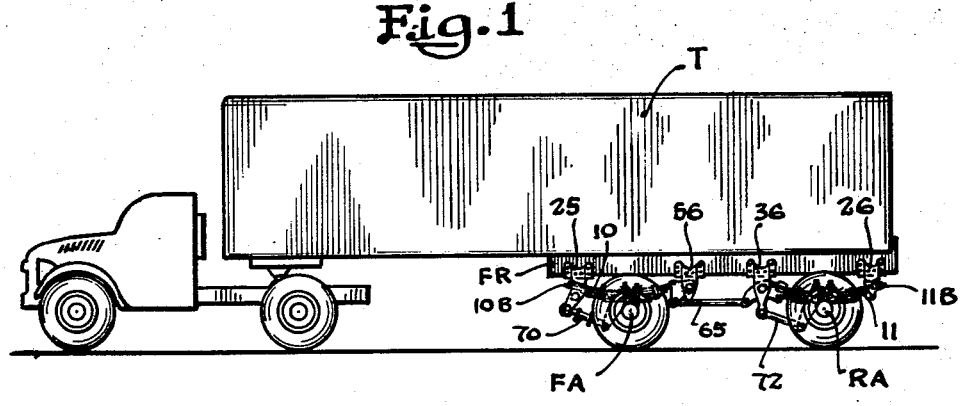
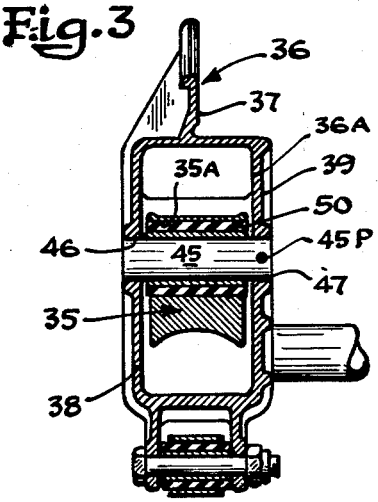
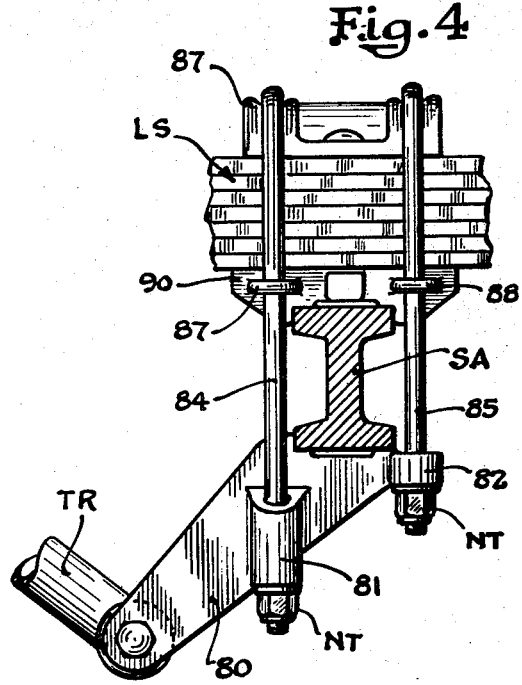
Inventor
Thomas E. Fossard
By Wallace, Kinzer and Dorn
Attorneys

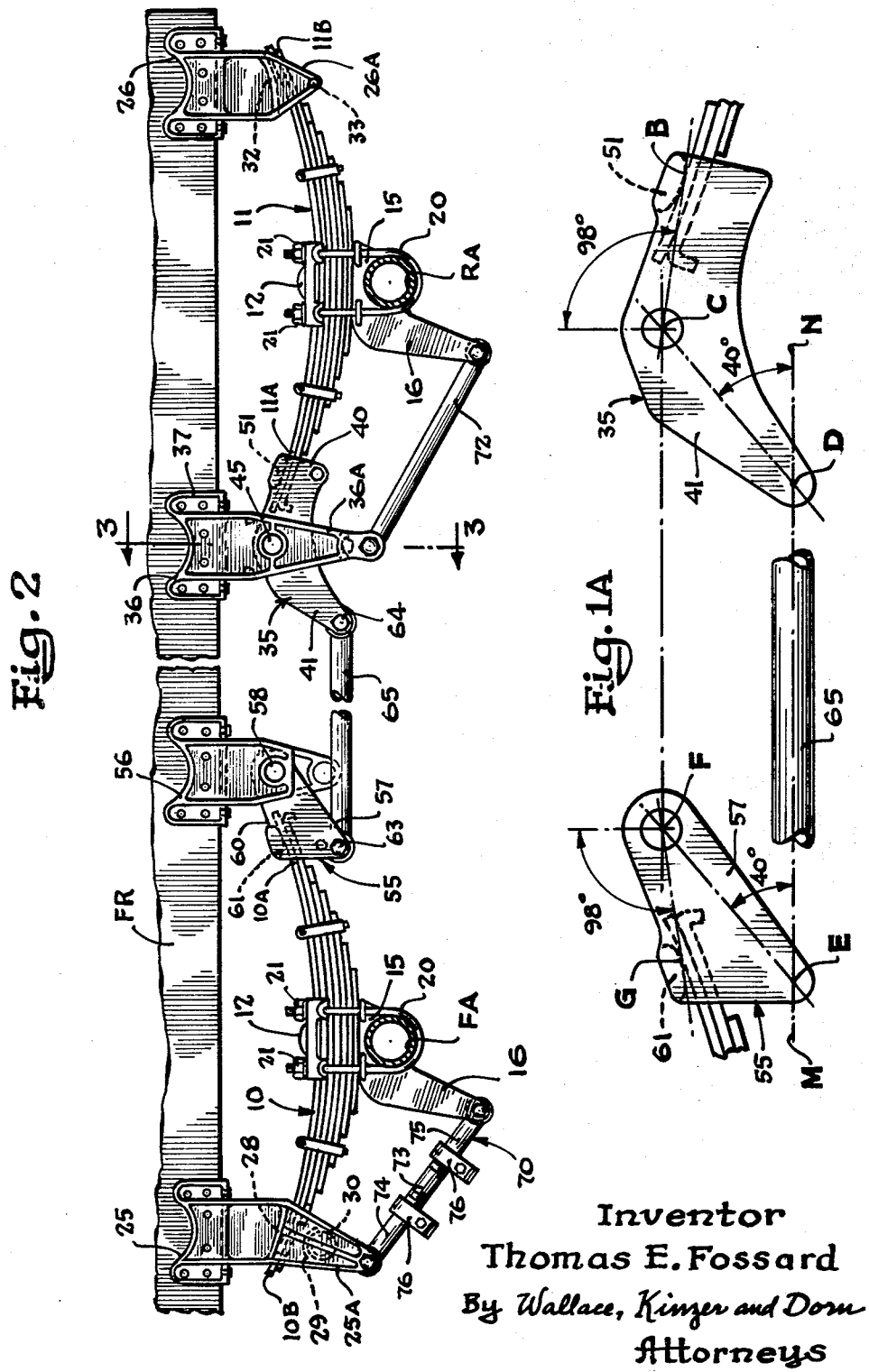

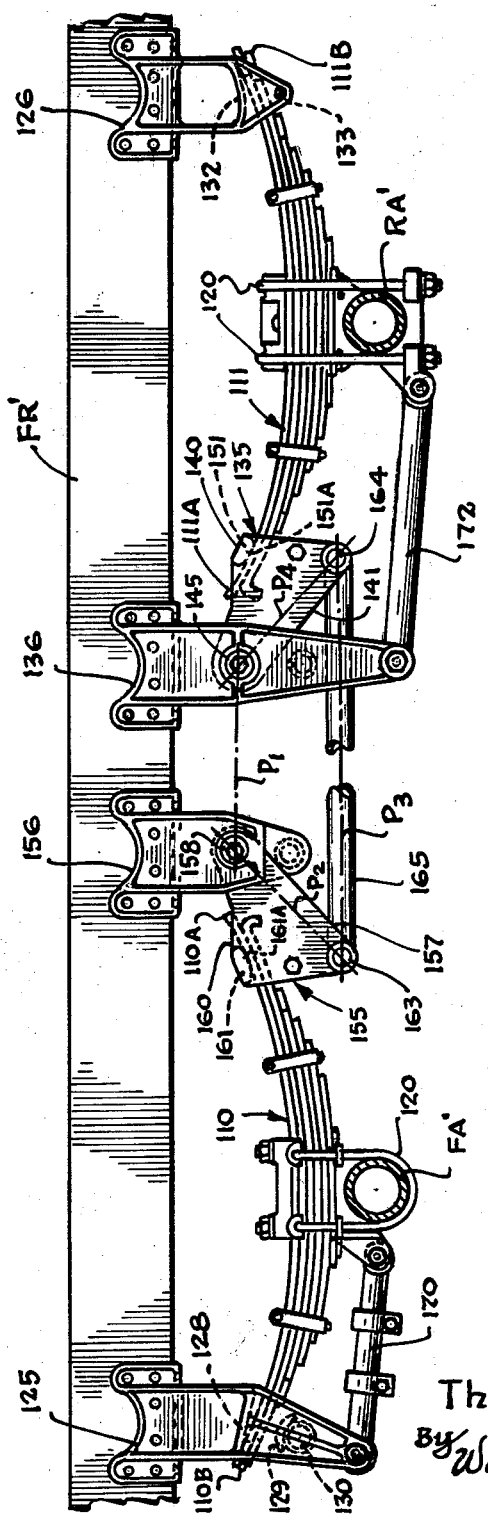

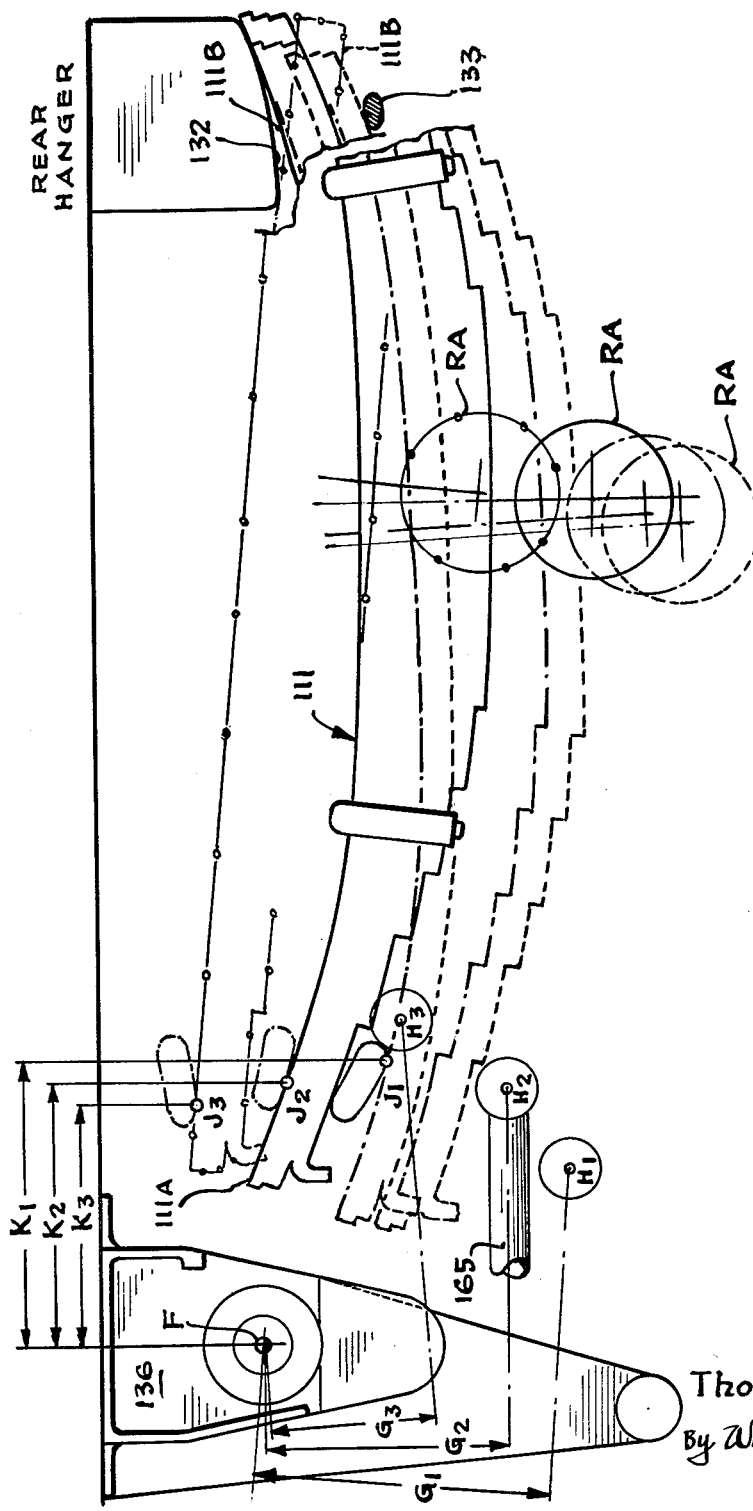

United States Patent Office 3,186,731
Patented June 1, 1965

3,186,731
VEHICLE SUSPENSIONS
Thomas E. Fossard, Springfield, Mo., assignor to A. J. Industries, Inc., Springfield, Mo., a corporation of West Virginia
Filed Dec. 7, 1964, Ser. No. 416,454
5 Claims. (Cl. 280—104.5)

This application is a continuation-in-part of application Serial No. 175,980, filed February 27, 1962, now abandoned.

This invention relates to an equalized suspension for a tandem axle vehicle.

The trailer of a trailer-truck combination is frequently of the tandem axle type, that is, the end of the trailer remote from the fifth wheel is supported by wheels on axles arranged one behind the other in a tandem relation. The degree to which the trailer may be bounced during the course of overland travel can be readily visualized, and this is particularly acute in the instance of empty or lightly loaded trailers, or in the instance of hauling light or fragile cargo such as flowers and similar perishable items.

The possibility of attendant damage in the instances mentioned above is a problem to be overcome, and it has heretofore been proposed to alleviate this problem to a considerable degree by utilizing elongated springs of the leaf type in a suspension for the tandem axles so disposed that the front and rear springs at each side of the vehicle frame are connected at their midpoints to the related axles and have the adjacent inner ends thereof associated with an equalizer of one kind or another. The equalizer serves to distribute impressed loads between the springs. Thus, the consequence of the arrangement for the equalized suspension above described is that if the front wheels in the tandem suspension, for example, should encounter a condition in the road producing a severe vertical movement in the front axle, the resultant deflection in the front springs will be transmitted by the equalizer in part to the rear springs.

In any event, the net effect of an equalized suspension for a tandem axle vehicle is to distribute between the springs any abnormal loading, whether the unusual spring deflection be in a negative or positive sense.

In the instance of a vehicle equipped with an equalizing tandem of the foregoing type, if the axles are in close proximity, their total load is concentrated on a relatively small portion of the roadway. However, if the axles are more widely spaced, the load is imposed on a comparatively larger portion of the roadway. From this it can be seen that the greater the vehicle axles are separated, proportionally there is that much less chance of damage to roadway, pavement or bridge structure due to the load of the vehicle. This effect is recognized by the various States in the establishment of legal minimum spacings for tandem axles for a specified load; and further, in many States, by the allowance of increased legal axle loading for tandems with widely spaced axles.

In order to achieve the advantages of widely spaced axles, it has been common practice in the industry to produce a tandem with an elongated equalizer or rocking beam of length compatible with the separation of the axles. This beam is, of necessity, a heavy, complex member. Furthermore, desired variations in axle spacing require the production of a specific beam for a particular axle spacing.

A primary object of the present invention is to construct a tandem of the foregoing type which will afford a lighter weight in construction and will permit variations in design to be selected almost at will. Thus, a characteristic feature of the present invention is that unit components for equalizing the load can be used selectively in the suspension depending upon load expectations. In other words, custom-built suspensions can be furnished from the standpoint of load expectations. For example, the present invention makes it possible to easily accommodate changes in the axle spacing, or to afford a suspension that is quick to respond to forces producing spring deflection, or slow to respond to this, depending upon the need as may be dictated by the cargo expected to be hauled.

Additional objects of the present invention are to enable the above objects to be realized in a construction which utilizes but relatively few parts; to be able to produce a light weight, low cost suspension capable of achieving the objects above discussed; and to compensate for changes in effective lever arm length during equalizer movement.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a somewhat schematic view of a trailer truck combination having a tandem axle trailer equalized with a suspension of the present invention;

FIG. 1A is a diagrammatic view of the equalizers and associated parts showing the geometry involved;

FIG. 2 is a partly broken away side elevation of a suspension assembly under the present invention;

FIG. 3 is a sectional view taken substantially on the line 3—3 of FIG. 2;

FIG. 4 is a detail view illustrating adaptation of the present suspension to an axle of the I-beam type;

FIG. 5 is a partly broken away side elevation of a suspension assembly under the present invention, being a modification different from the suspension of FIG. 2; and FIGS. 6 and 6A represent a schematic view of the operating features of the suspension of FIG. 5.

Figure 6:
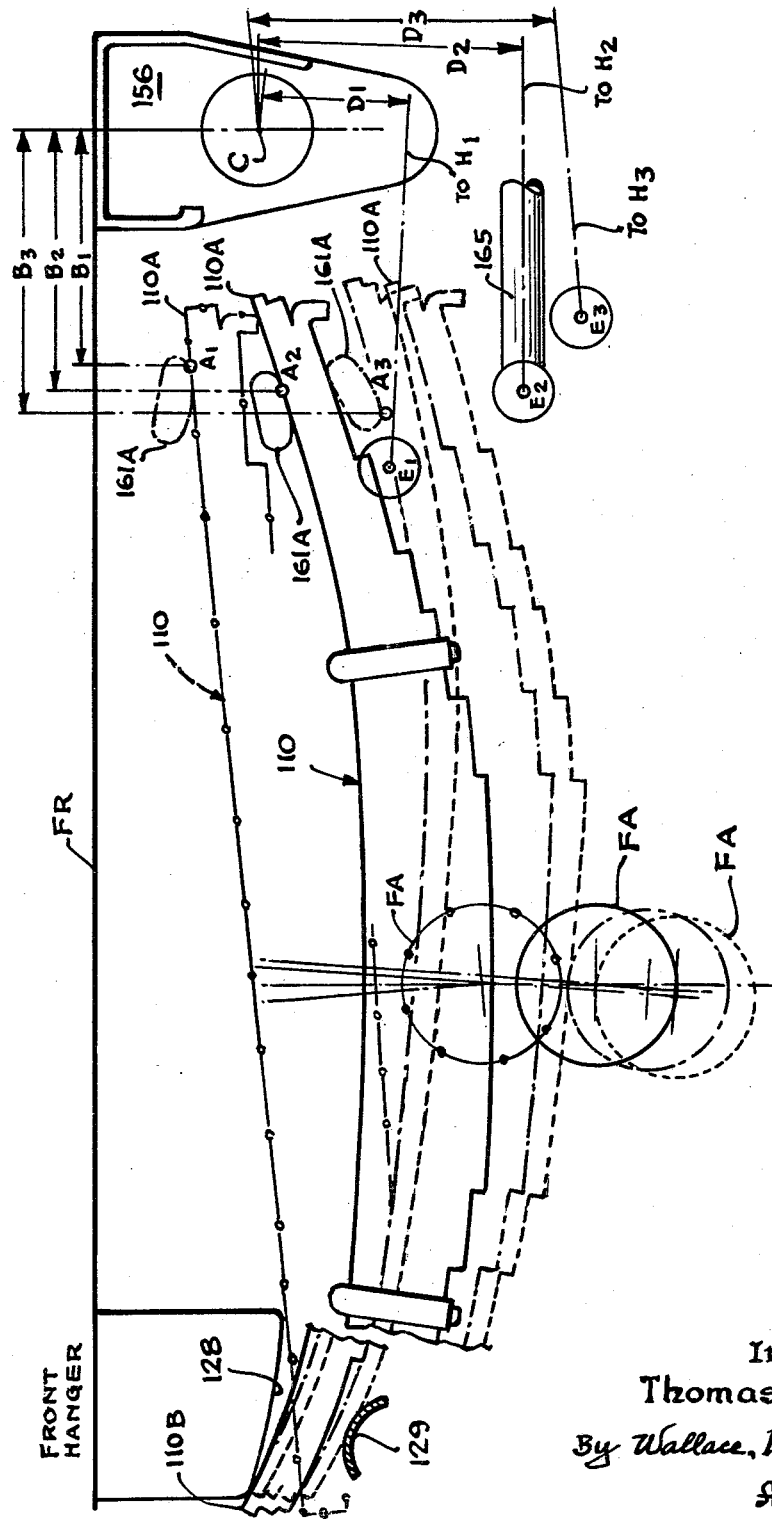

In FIG. 1 there is illustrated a tandem axle vehicle in the form of a trailer T having front and rear axles FA and RA supporting, for rotation, the related wheels, the axles being of the so-called dead or undriven type, that is, the axles are towed by the driven cab. In order to preserve the cargo or to prevent damage to the trailer or both, the axles FA and RA are associated with an equalized suspension of the semi-elliptic leaf spring type, the details of which are illustrated in FIG. 2.

Thus, referring to FIG. 2, it should first be noted that what is shown is representative of the suspension at one side of the frame FR of the vehicle described above, the arrangement being substantially duplicated for all practical purposes on the opposite side of the frame.

The front and rear axles FA and RA identified in FIG. 1 are identified by like reference characters in FIG. 2. The axles are assumed to be of tubular configuration, but this is merely typical as will be evident from the disclosure in FIG. 4 hereinafter discussed. In any event, the near side of the suspension as viewed in FIG. 1 and FIG. 2 includes springs of the elongated type, specifically a semi-elliptic rear compound leaf spring 11, and in connection with what has been mentioned above, there are similar springs arranged as a tandem front and rear set at the opposite or far side of the suspension, not visible in FIGS. 1 and 2. Therefore, what will be described with regard to the suspension illustrated in FIG. 2 is, in the complete suspension assembly, duplicated at the opposite side of the vehicle, with but a single exception to be noted as regards adjustable torque rods.

As will be apparent from FIGS. 1 and 2, the independent spring means 10 and 11 are arranged in tandem relation one behind the other so that the springs have inner ends 10A and 11A that are disposed adjacent one another, with outer ends 10B and 11B remote from one another. Viewed another way, the end 10B of the front spring 10 is forwardmost and the rear end 11B of the rear spring 11 is rearwardmost as viewed in FIGS. 1 and 2.

As noted, the springs 10 and 11 are of the semi-elliptic compound leaf type arranged in the usual fashion with the concave side nearest the vehicle frame. The geometry of the springs can be varied of course from what is shown. The springs 10 and 11 are, however, connected at substantially their midpoints respectively to the front and rear axles. Such connections are identical for both the front and rear springs, and include a top plate 12 configured to embrace the back or concave midsection of the spring stack. The bottom of the spring stack in each instance rests on an axle seat 15 having an upper face complemental to the arc of the lowermost leaf spring with the lower face thereof shaped complemental to the curve of the axle FA or RA to neatly embrace the same.

An arm 16 extends forwardly from and depends below each axle seat 15 and the lower end thereof is preferably well below the axis of the related axle for a reason to be mentioned below. Each arm 16 is cast integral with the related axle seat 15, and the latter are rigidly secured as by welding to the related axles to be unitary therewith.

It will be seen that each of the elongated spring means 10 and 11 is embraced at the mid-point thereof by the seat plates 12 and 15. These enable the springs to be firmly joined independently to each related axle. To this end, U-bolts 20 are disposed with the bight portions thereof at the underside of the axles FA and RA and with the legs thereof projected through receiving sockets provided therefor in the axle seat plates 12 and 15. The threaded ends of the U-bolts 20 project upwardly beyond the top seat plates 12, and self-locking nuts 21 are threaded tightly thereon to the extent that each spring is rigidly joined to the related axle so that any movement in the axle is accompanied by movement of the spring.

The springs being joined at their midpoints to the axles results in the ends of the springs projecting fore and aft of the axles. The front ends 10B of each front spring 10 are arranged to react against the frame of the vehicle in the event the spring is flexed by an upwardly applied force encountered by the axle, and this is also true of the rear end of each rear spring, as will be apparent from the description to follow. In contrast, the rear end of each front spring and the front end of each rear spring is equalized to enable loads to be distributed back and forth between the springs in a manner described hereinafter.

Thus, referring again to FIG. 2, it will be observed that a front axle bracket 25 and a rear axle bracket 26 are adapted to be secured to the frame FR at locations corresponding to the remote ends 10B and 11B of the spring means. The brackets 25 and 26 include downwardly extending leg portions 25A and 26A respectively. The bracket 25 is provided on the inside face thereof below the frame FR with a substantially horizontal support pad 28 having a lower surface engaged by the end 10B of the front spring 10 as shown in FIG. 2. Advantageously, a horizontally disposed pipe brace 30 is secured to the inside face of the bracket 25 and extends transversely beneath the frame FR to have the opposite end there joined in like fashion to an identical bracket as 25 which will be located at the far side of the frame represented by the frame FR in FIG. 2.

The leg 25A of the bracket 25 is in reality a hollow housing of the kind hereinafter disclosed, and the front end 10B of the front spring is disposed therein to engage the pad 28.

The pad or support 28 associated with the bracket 25 is what enables the front spring 10 shown in FIG. 2 to in effect act against or bear on the frame FR when supporting the load of the vehicle. A saddle 29 is arranged within the depending housing 25A of the bracket 25 beneath the front end of the front spring disposed therein. The saddle 29 serves to prevent the spring from being dislocated from the bracket 25.

The rear end of the rear spring is supported in a manner similar to the front end of the front spring. Thus, the end 11B of the spring 11 bears against the underside of a horizontally disposed pad or strap 32 which projects from the inside face of the rear bracket housing 26 to be a part thereof, in effect representing an immovable part of the frame, as in the instance of the pad 28. Dislocation of the spring 11 relative to the housing of the bracket 26 is prevented by a pin 33 arranged within the bracket housing 26 directly beneath the end 11B of the spring 11 disposed therein.

As noted above, the inner or adjacent ends of the springs 10 and 11 are to be equalized, but in contrast to the most common equalizer arrangement, the present suspension includes, at each side of the vehicle, two equalizer support brackets and two pivotally mounted equalizers or rockers, and these may be quite widely spaced for purposes to be mentioned hereinafter. Again, the arrangement of parts is the same on each side of the frame, and a duplicate of the equalizing parts to be described in connection with FIGS. 1A and 2 will be duplicated on what amounts to the far side of the frame FR.

Considering first the front end 11A of the rear spring 11; this is associated with the equalizer or rocker 35 which in turn is pivotally supported by a bracket 36 secured to the frame FR. The bracket 36 is rigidly bolted to the frame FR in the manner of the brackets 25 and 26, and is accurately located with regard to the length of the spring 11 which is to be supported by the bracket 26 on one hand and the equalizer or rocker 35 on the other hand.

The bracket 36 is illustrated in detail in FIG. 3, and what is shown there is generally applicable to each of the four brackets herein described. Thus, the bracket 36 includes a flat attaching flange 37 to be bolted to the frame FR and the leg or portion 36A that depends therefrom is in the form of a housing having spaced sides 38 and 39 as shown in FIG. 3.

The equalizer 35 is of a size, as shown in FIG. 3, to be accommodated between the spaced side walls 38 and 39 that define the depending portion 36A of the bracket 36. The equalizer 35 is in the form of a sturdy casting having an opening 35A, FIG. 3, substantially in the medial portion thereof which results in left and right hand leg portions 40 and 41, FIG. 2, of the equalizer 35 extending outward on opposite sides of the opening 35A. These leg portions 40 and 41 play an important role in the operation of the suspension as will be described hereinafter.

The opening 35A in the equalizer 35 is of relatively large size and is arranged to be disposed concentrically about a horizontal support shaft 45, FIG. 3, which has ends disposed within openings 46 and 47 formed in the opposite side walls 38 and 39 of the bracket 36 which define the depending portion 36A thereof. The support shaft 45 is secured within the bracket against rotation as by a roll pin 45P, FIG. 3.

The equalizer 35 is supported pivotally by the pin or shaft 45, and a bearing member including a rubber sleeve 50 is interposed between the equalizer 35 and the pivotal support 45 therefor. The rubber sleeve 50 is squeezed by the equilizer 35 pressed thereover to be under radial compression so that it tends to maintain its mounted position. The bearing 50, however, does not prevent rocking of the equalizer 35.

The arms 40 and 41 of the equalizer 35 project fore and aft of the pivotal support 45. The end portions thereof are hollow, and this enables the front end of the rear spring 11 to be projected into the end of the arm 40 of the equalizer 35 to engage a support pad 51 which is a part of the equalizer arm 40.

Thus, it will be seen that the equalizer arm 40 is what supports the front end of the rear spring 11. The function of the equalizer arm 41 will be discussed hereinafter, following the description of the equalizer 55 that is associated with the rear end of the front spring 10.

The rear end of the front spring is associated with a pivotal equalizer 55, pivotally supported by a shaft in a bracket 56 which is similar to the bracket 36 described above. The equalizer 55 includes two separate portions or legs, but these, unlike the equalizer 35 described above, having arms projected fore and aft of its pivot, project from the same side of the pivot support for the equalizer 55. However, both portions or arms of the equalizer 55, like the equalizer 35, move in unison during oscillation as will be apparent from the description to follow.

Thus, as shown in FIG. 2, the equalizer or rocker 55 includes a lower arm portion 57 extending downwardly at a predetermined angle from a horizontal support shaft 58 carried by the bracket 56 and which serves to pivotally support the equalizer 55. The equalizer 55 includes an upper arm portion 60 projecting forwardly of the pivot 58 at a different angle. The arm 60 of equalizer 55 includes a support pad 61 engaged by the rear end of the front spring 10.

The equalizer 55 is associated with its pivot 58 in substantially the same manner that the equalizer 35 is associated with its pivot 45, including an interposed bearing of resilient material as 50 serving, by the degree of radial compression established therein in the manner described above, to establish predetermined resistance to the tendency of the equalizer to be pivoted by forces exerted thereon.

The equalizer assembly is completed by a sturdy horizontal link 65 which is of straight form. The link 65 is connected at one end pivotally to the free end of the lower equalizer arm 41, and is connected at its opposite end pivotally to the free end of the lower equalizer arm 57. It will be recognized that oscillation of one equalizer will be transmitted through the link 65 to the other equalizer.

The opposite ends of the force transmitting link 65 are preferably provided with openings in which are located bearing elements similar to the element 50 described above and which surrounds concentrically the shanks of support bolts 63 and 64 carried at the respective ends of the link 65.

Referring to FIGS. 1 and 2, the depending leg 25A of the front bracket 25 extends well below the transverse bracing tube 30, and a front torque rod 70 is connected at the front end thereto and extends rearward to be connected to the lower end of the arm 16 that is associated with the axle seat 15. The torque rod 70 as illustrated in FIG. 2 is adjustable in nature, whereas the corresponding torque rod that would be on the opposite side of the frame FR as viewed in FIG. 2 is of one piece construction similar to the torque rod 72, FIG. 2, to be described hereinafter.

The torque rod 70 includes at the midsection thereof an adjusting tube 73 having threaded ends of opposite hand respectively associated with correspondingly threaded ends of tube sections 74 and 75. The threaded ends of the tube section 74 and 75 are split and clamps 76 are associated therewith so as to rigidly clamp the three sections together once the proper adjustments have been completed. Thus, by loosening the clamps 76 and turning the intermediate adjusting member 73, the effective length of the torque rod 70 can be predetermined, primarily for the purpose of aligning the axles FA and RA to be parallel one to another.

The torque rod 72 extends between the lower end of the bracket 36 and the arm 16 associated with the rear axle seat 15. This torque rod 72 is of a one-piece construction, but the torque rod corresponding thereto on the opposite side of the frame will have the adjustment features described above in connection with the torque rod 70, and this, as noted, is for the purpose of aligning the axles.

It will be recognized from the construction illustrated in FIG. 1 that the torque rods 70 and 72 and the brackets 25 and 36 associated therewith serve to enable the axles in effect to be towed by the trailer. These serve at the same time to prevent the axles from turning, and since the torque rods 70 are connected to the arms 16 at points below the axes of the axles FA and RA, any tendency for so-called brake hop to occur is resisted in the manner disclosed in United States Patent No. 2,841,414. It may be further mentioned in this connection that the connections for the torque rods at the ends thereof to the associated parts including the brackets and the axle seat arms advantageously include rubber bushings under a controlled amount of compression as described in Patent No. 2,653,035.

When a load is impressed on one of the axles, say the front axle FA, as a result of encountering an unexpected road condition, assumed to result in a sudden upward impact transmitted to the axle FA, the spring 10 as a result tends to be lifted, and under such circumstances will tend to be straightened somewhat inasmuch as the front end 10B thereof in effect reacts on the frame of the vehicle. However, the rear end 10A also moves upwardly, and as a result clockwise movement is imparted to the equalizer 55, and the arm 57 thereof exerts tension on the link 65 tending to pull link 65 forward. At the same time, the rear equalizer 35 tends to be rocked or pivoted clockwise by the link 65 undergoing forward movement. This produces a downward thrust on the front end of the rear spring 11A through the equalizer arm 40.

In this manner, a part of the front axle loading that produced deflection of the front spring 10 is transmitted through the equalizer 55, the link 65 and the equalizer 35, to the front end of the rear spring.

When the unexpected load exerted on the front axle, resulting in load equalization described above, is removed, the rear spring tends to restore itself to its normal or free running condition, manifest in an upward rebound. Counterclockwise movement is produced in equalizer 35 by the upwardly moving front end of the rear spring exerting a thrust on the equalizer arm 40. This produces rearward movement of the link 65, resulting directly in counterclockwise movement of the front equalizer 55, causing the latter to be restored to its free running condition.

It will be recognized that the play of forces above described will produce periodic oscillation gradually dampened out to the extent that the equalizers eventually assume their normal running condition characteristic of smooth road conditions.

FIG. 1A is a diagrammatic view of the geometry of the equalizing members of the suspension of FIG. 2. The pivot points 45 and 58 for the equalizers are identified by the reference characters C and F in FIG. 1A. The equalizer arms are identified by the same reference characters applied thereto in FIG. 2. The pivotal connections of the arms 41 and 57 to the link 65 are identified by reference characters D and E. The upper equalizer arms engage their spring ends at points B and G. The effective length of link 65 is ED.

It will be observed in FIG. 1A that each of the arms 40 and 60 defines an angle of approximately 98° with a vertical line drawn through the pivot points C and F.

The equalizer arms 41 and 57, connected pivotally to opposite ends of the link 65 at D and E, are parallel to one another and intersect the center line MN of the link 65 at 40° angles. This condition of parallelism is an important feature of the suspension of FIG. 2, and in this connection it will be observed that a line FC drawn through the pivot points F and C is substantially parallel to the center line MN and cooperates with this center line and the center lines CD and FE of the arms 41 and 57 to define a parallelogram.

Resultantly, the arm 65, when it moves during load equalizing, moves in planes parallel to its own center line MN, and the angles FED and CDN, though they may change, remain substantially equal at all times. In other words, the link 65 when pushed or pulled as an incident to load equalizing movements, will move parallel to the line FC. This characterizes equal moments in the equalizers. It has been found that these relations are important in assuring distribution of the loads between the axles and in assuring that the moving parts of the equalizer are restored to the normal condition illustrated in FIGS. 1 and 2 when the applied forces, necessarily producing the need for equalization, have been removed.

As noted above, the present invention is susceptible to different geometrical variations, and typical of this is the square axle adaptation illustrated in FIG. 4. Thus, instead of a tubular front or rear axle, the axle SA, FIG. 4, is of the I-beam type, and this modification also serves to illustrate a different form of attachment of the spring seat of the anti-brake hop arm to the axle. Thus, the torque rod TR, FIG. 4, of the type identified by reference character 70 or 72 above, is pivotally connected at its end adjacent the axle SA to the lower end of an arm 80 which extends quite well below the horizontal center line of the axle SA. Additionally, the arm 80 is provided with sockets 81 and 82 adapted to receive the ends of U-bolts 84 and 85, and it will be appreciated that the side of the arm 80 not visible in FIG. 4 is provided with like sockets for the opposite legs of the U-bolts 84 and 85.

The bight portions of the U-bolts 84 and 85 are seated in grooves formed in a top spring seat 87, and intermediate portions of the shanks of the U-bolts 84 and 85 are passed through eye sockets 87 and 88 provided in an upper axle seat member 90 that is interposed between the axle and the lower surface of the leaf spring set LS. The threaded ends of the U-bolts 84 and 85 extend free of the lower socket elements 81 and 82, and nuts NT are threaded tightly thereon sufficiently to tension the U-bolts 84 and 85 to such an extent as to lock the spring seat to the axle SA while locking the arm 80 to the axle at the same time.

It can be readily visualized from what is shown in FIG. 1 that the present suspension is capable of being accommodated to axle spacing of widely variant order. Thus, if the spacing between the axles FA and RA should be shortened or lengthened, as the case may be for another vehicle, a suspension of the present invention can be easily selected for such varying conditions merely by selecting a link 65 of the correct dimension. If the axle spacing should be shortened in comparison to FIG. 1, it will be realized that the resultantly shortened link 65 would result in closer spacing of the brackets 36 and 56, and the same is true of the outermost brackets 25 and 26.

If it is desired, for given axle spacing, to alter the equalizers for what amounts to a different force diagram, the equalizers 35 and 55 can be replaced by other equalizers of appropriate design. Thus, the parallelogram illustrated and described in connection with FIG. 1A can be maintained while varying the lengths of the lever arms FG and BC to be different one from another, and this will necessarily result in unequal load distribution, which may in fact be desirable under some circumstances. The same effect can be achieved by producing unequal lengths in the lever arms CD and EF, manifest in canting of the link 65. In like manner, a more swift or more retarded equalizer response can be achieved by using bearings as 50 under more or less compression between the pivot support shafts and the walls of the related equalizers defining the openings therein that surround the bearings 50 which tend to resist equalizer motion.

It will be recognized from the foregoing that the present invention enables load equalizers to be realized for a tandem axle vehicle having quite widely spaced axles merely by selecting a link 65 of appropriate dimension. Even so, equalizers as 35 and 55 can be substituted by a different pair of equalizers as may be necessitated or desired in view of the cargo being handled, or to alter the load equalizing forces to the best advantage, and consideration will be given to such a modification.

The suspension illustrated in FIGS. 5, 6 and 6A for a tandem axle vehicle is one wherein lines drawn through the pivot points of the equalizer arrangement (lines P1, P2, P3 and P4, FIG. 5) define or bound what is substantially a trapezoid in comparison to the suspension of FIG. 2 where similar lines bound what is substantially a parallelogram as will be evident in FIG. 1A. As will be described in more detail hereinbelow, the equalizer means of the suspension of FIG. 5 is so arranged and constructed as to provide changes in effective lever arms in the course of equalizing action. In this connection it should be observed that the term "equalization" under the present circumstances is used in a generic sense to indicate that when a load is impressed on one spring as the result of vertical axle movement, at least part of that load is transferred to the other spring through the so-called equalizer parts. Thus, as was noted above, the principle of the present invention makes it possible to alter the equalizers for what amounts to different force diagrams, and the modification now to be described in an example.

The suspension shown in FIGS. 5, 6 and 6A is again one including brackets which support the suspension including the equalizer parts to be disposed beneath the frame FR' or a vehicle. The vehicle is equipped with a front axle FA' and a rear axle RA', FIG. 5.

As in the foregoing embodiment, FIG. 5 shows the suspension as it appears on one side of the vehicle frame, and the parts are duplicated on the opposite side. There is a front spring 110 for the front axle FA' and a rear spring 111 for the rear axle RA', and these independent springs means are arranged one behind the other in a tandem relationship so that the springs have inner ends 110A and 111A disposed adjacent one another, with the outer ends 110B and 111B remote from one another. While the springs are illustrated as being of the semi-elliptic compound leaf type, other configurations can of course be utilized.

As in the foregoing embodiment described above, the springs 110 and 111 are connected at substantially their mid-points respectively to the front and rear axles by means including U-bolts 120, corresponding axle seat parts, and locking nuts equivalent to the arrangement described above, and hence need not be further described in detail.

Again referring to FIG. 5, it will be observed that a front bracket 125 and a rear bracket 126 are adapted to be secured to the frame FR' which locations correspond to the remote fore and aft ends 110B and 111B of the spring means. As in the foregoing embodiment, these brackets serve to enable the outer ends of the spring means to be supported on the frame of the vehicle for free or unencumbered movement away from the vehicle frame. Thus, each such bracket is provided with a support pad 128 and 132, respectively, against which the remote ends 110B and 111B of the spring means react when loaded as when supporting the vehicle frame FR' in operation. In other words, the outer ends of the springs 110 and 111 are not shackled, but are free to flex and shift or slide in the course of supporting loads and in the course of equalizing movement, typical of the type of tandem suspension involved. This is also true of the inner ends of the springs that are supported on the pads of the equalizers as will be noted below.

Displacement of the spring means from an operative state in the course of flexing relative to the brackets 125 and 126 is prevented, for the remote end of the front spring, by a saddle 129 on a pipe brace 130 and, for the remote or outer end of the rear spring, by a pin 133 that is secured to the rear bracket 126. Thus, the remote ends of the springs are confined or housed for operation in the desired manner between their support pads 128 and 132 and the corresponding displacement-preventing means 129 and 133; but limited vertical movement of the springs therebetween is permitted relative to the frame of the vehicle as in the foregoing embodiment.

The inner or adjacent ends of the springs are equalized in order that at least part of a significant load impressed on one axle and associated spring will be transferred to the other, and in accordance with the principle of the present invention the equalizer of the suspension of FIG. 5 is so constructed as to enable equalization or transferring of loads to be equalized in a suspension adapted for tandem axles that are relatively widely spaced. To this end, the front end 111A of the rear spring is associated with an equalizer or rocker 135 which is pivotally supported by a bracket 136 rigidly secured in depending relation to the frame of the vehicle, and in such a fashion, as shown in FIG. 5, as to dispose the equalizer 135 beneath the frame of the vehicle, as in the foregoing embodiment. Inasmuch as the shape and form of the bracket 136 is similar to the bracket 36 described above, this phase of the disclosure need not be repeated.

The equalizer 135 is supported for pivotal movement on a support shaft 145 which in turn is supported by the bracket 136, and advantageously a bearing member is associated with the pivotal support for the equalizer as described above.

The equalizer 135 includes a rearwardly extending arm 140 and a downwardly and rearwardly extending arm 141. The arm 140 of the equalizer 135 is provided on the inner side thereof with a support pad 151 which presents a lower arcuate surface 151A against which the inner end 111A of the spring 111 bears, in sliding contact therewith. Thus it will be seen that the equalizer arm 140 is what supports the front end of the rear spring 111.

The rear end of the front spring is associated with a pivotal equalizer 155, pivotally supported by a shaft 158 in a bracket 156 in a fashion similar to that described above for the bracket 36.

The equalizer 155 includes an upper arm portion 160 projecting forwardly of the pivot 58. The arm 160 is provided on the inner side thereof with a support pad 161 having an arcuate lower face 161A against which bears the upper side of the rear end of the front spring 110 in the fashion that the upper side of the front end of rear spring 111 engages its support pad 151. The equalizer 155 includes a downwardly and forwardly extending arm 157.

The equalizer assembly includes a sturdy horizontal link or lever 165 directly connected at its rear end pivotally to the equalizer arm 141 of the equalizer 135. This pivotal connection is identified by the reference character 164. The equalizer link 165 extends forwardly from the rear equalizer 135 and is pivotally connected at 163 at its front end directly to the arm 157 of the front equalizer 155. It will be recognized from the description of the connections thus far described that oscillation of one equalizer will be transmitted through the link 165 to the other equalizer, and advantageously bearings are associated with the pivotal connections 163 and 164 as described above in connection with the suspension of FIG. 2.

Torque rods 170 and 172 are included in the suspension and are effective to connect the front and rear axles to the frame of the vehicle through the depending portions of the brackets 125 and 136 as will be observed in FIG. 5, substantially in the manner as this is described above in connection with the suspension of FIG. 2.

When a load is impressed on one of the axles, say the front axle FA', as a result of encountering an uneven road condition, assumed to result in a sudden upward impact to the front axle FA', the front spring 110 as a result will be lifted, and under such circumstances will be straightened somewhat due to the ability thereof to flex and to straighten due to the unrestrained or unencumbered supporting thereof at the front and rear ends. (This of course is also true when considering sudden loading of the rear axle RA'.) When the rear end 110A of the spring 110 moves upwardly, clockwise movement is imparted to the equalizer 155 as the result of the bearing of the rear end 110A, in effect, on the upper arm 160 of the equalizer 155.

Resultantly, the equalizer 155 through its other arm 157 exerts tension on the link 165 tending to pull the link 165 forwardly. At the same time, a force is imparted to the lower arm 141 of the equalizer 135 causing the latter to rock or oscillate in a clockwise fashion about its pivot 145. This produces a downward thrust on the front end 111A of the rear spring 111 through the upper arm 140 of the equalizer 135, and in this manner a part of the front axle loading that produced upward deflection of the front spring 110 is transmitted through the equalizer 155, the link 165 and the equalizer 135 to the rear spring.

To this extent the operation of the equalizer of the suspension illustrated in FIG. 5 is similar to the operation of the equalizer described above in connection with FIG. 2 in that an encountered force exerted on one axle causing its equalizer to rock is transmitted directly through the link 165 at the opposite ends thereof directly to the other equalizer which imposes part of the encountered force on its spring and axle, and of course the parts tend to restore themselves to the normal free-running condition substantially as shown in FIG. 5 when the load on the front spring that resulted in a transmittal of forces is removed.

The lines P2 and P4 joining and terminating at the pivot points 145–164 and 158–163 represent the effective lever arms 141 and 157, just as the lines CD and EF, FIG. 1A, represent the effective lever arms 41 and 57. With this in mind, consideration will now be given to the way in which changes in the effective lever arms of the suspension of FIG. 5 off-set other changes in effective lever arms, accounted for by the trapezoid defined by the lines P1, P2, P3 and P4, FIG. 5.

FIGS. 6 and 6A illustrate various positions assumed by the axles and suspension in the course of operation of the suspension. It should first be observed that the normal running condition for the suspension in FIGS. 6 and 6A is shown by the solid line position of the front spring 110 and the rear spring 111, and the associated axles FA and RA. This corresponds to the state of the suspension shown in FIG. 5.

Additionally, in the normal or free-running condition of the suspension, the rear end 110A of the front spring engages the arcuate lower face of the equalizer pad 161A at the point $A_2$, and in like manner the front end 111A of the rear spring engages the arcuate lower surface of the equalizer pad 151A at the point $J_2$. Under these conditions the link 165 is disposed with its pivotal connections to equalizers at the points $E_2$ and $H_2$.

The pivot points for the equalizers 135 and 155 are indicated in FIGS. 6 and 6A respectively at F and C. The effective length for the front equalizer lever arm 160 is $B_2$, FIG. 6, and the effective length for the rear equalizer lever arm 140 is $K_2$, FIG. 6A, such that these lever arms are substantially equal in length. Under the same condition, the lever arm 157 of the equalizer 155 has an effective length $D_2$, and lever arm 141 of the equalizer 135 has an effective length $G_2$, substantially equal in length.

When the front equalizer is rocked clockwise due to the front axle FA and the associated spring 110 being forced closer to the frame FR', this, as shown in FIG. 6, is a condition where the front equalizer wear pad 161A is in an uppermost position with the rear end 110A of the front spring bearing thereof at the point $A_1$. The effective length of the equalizer lever arm 160 is shortened from $B_2$ to $B_1$, and the effective equalizer lever arm that was $D_2$ is likewise shortened to $D_1$. The link 165 tilts so that its position becomes $E_1$–$H_1$.

Thus, it will be seen that as the suspension articulates, the contact point between the front spring and the equalizer arm 160 changes, and it will also be evident from FIG. 6 that the contact point between the front end 110B of the front spring 110 and the front hanger bracket surface 128 also changes. It will be evident from what is now to be described that by resorting to the trapezoid configuration described above, changes in effective lever arm lengths of the one equalizer 155 are compensated at the other equalizer 135.

Thus, the action described immediately above concerning raising of the front spring is accompanied by the following action at the rear equalizer. First, the link 165 in moving from position $E_2$ to position $E_1$, FIG. 6, is accompanied by turning or canting of the link 165 so that its rear pivotal connection to the rear equalizer results in this pivotal connection shifting downward from the position $H_2$, FIG. 6A, to the position $H_1$. The position of the link 165 is thus $E_1$–$H_1$, FIGS. 6 and 6A, and concomitantly the rear equalizer 135 is rocked clockwise causing its wear pad contact point for the front end of the rear spring to move from position $J_2$ to $J_1$. The effective length for the lever arm 140 therefore become $K_1$, FIG. 6A, lengthened in comparison to the normal length $K_2$. It will also be realized from FIG. 6A that at this time the effective length for the rear equalizer arm 141 is lengthened from $G_2$ to $G_1$.

Thus it will be seen that whereas the effective lever arms for the front equalizer are shortened under the condition under consideration, the effective lengths for the rear equalizer lever arms are lengthened for compensation thereby to assure nearly equal transfer of load from the front axle and spring to the rear axle and spring. It should also be observed that the compensation is somewhat more than that required merely to account for the shortening of the front equalizer lever arms, due to the fact that there should also be compensation for the shifting of the front spring in its front hanger bracket 125 and the shifting of the rear spring in its rear hanger bracket 126.

Of course operation of the suspension in a reverse sense, that is, transfer of loading from the rear spring to the front spring, is identical to what has so far been described in connection with FIGS. 6 and 6A. In this sense, the front end of the rear spring would rise causing a shortening of the effective length of the rear equalizer arm 140 from a length $K_2$, FIG. 6A, to a length $K_3$. The transfer link 165 would then occupy position $H_3$–$E_3$, whereby the effective length for the lever arm 157 of the front equalizer lengthens from $D_2$ to $D_3$, and at the same time the effective length of the front equalizer arm 160 is lengthened from $B_2$ to $B_3$, FIG. 6.

Hence, while I have illustrated and described preferred embodiments of the present invention, it is to be understood that these are capable of variation and modification, and I therefore do not wish to be limited to the precise details set forth, but desire to avail myself of such changes and alterations as fall within the purview of the following claims.

I claim:
1. In a suspension for a vehicle having tandem axles, elongated springs independent of one another, means enabling each of said springs substantially at the medial portion thereof to be connected to the axles so that the springs have inner ends disposed toward one another and outer ends spaced remotely from one another, means to support the outer ends of the respective spring means on the frame of the vehicle for free or unencumbered movement away from the vehicle frame, a first equalizer bracket to be secured to the frame of the vehicle and having a first equalizer pivotally related thereto, said equalizer having an arm engaged in sliding contact with and by the inner end of one of the spring means so as to be rocked upon a vertical force being impressed on the corresponding axle and spring, a second equalizer bracket to be secured to the frame of the vehicle and having a second equalizer pivotally related thereto, said second pivotal equalizer having an arm engaged in sliding contact with and by the inner end of the other of the spring means so as to be rocked upon a vertical force being exerted on the corresponding axle and spring, a single link interconnecting said equalizers, said first and second equalizers being pivoted intermediate the inner ends of said springs, and said equalizers each having another arm depending below the first-named arm thereof and having a point of direct pivotal connection to said link so that an encountered force exerted on one axle causing its equalizer to rock is transmitted directly through the link at opposite ends thereof directly to the other equalizer which imposes part of said encountered force on its spring and axle.

2. A suspension according to claim 1 wherein the other arms of the equalizers, the link joining the same, and a line drawn through the pivot points of the equalizers define substantially a parallelogram.

3. A suspension according to claim 2 wherein the first-named arms of the equalizers extend from the pivot points of the equalizers at approximately the same angle.

4. The suspension of claim 1 wherein the equalizers brackets are disposed beneath the frame of the vehicle and wherein the equalizers supported thereby are below the frame of the vehicle.

5. The suspension of claim 1 wherein the link joining the other arms of the equalizers, a line drawn through the pivot points of the equalizers, and said other arms of the equalizers define substantially a trapezoid.

References Cited by the Examiner

UNITED STATES PATENTS

| 1,540,289 | 6/25 | Schanno | 280—104 |
| 1,685,295 | 9/28 | Rodin | 280—104.5 |
| 2,280,302 | 4/42 | Reid | 280—104.5 |
| 2,880,991 | 4/59 | Ward | 280—104.5 |

FOREIGN PATENTS

| 291,844 | 6/28 | Great Britain. |
| 386,053 | 1/33 | Great Britain. |

MILTON BUCHLER, *Primary Examiner.*